(12) United States Patent
Benhammadi

(10) Patent No.: US 12,608,139 B2
(45) Date of Patent: Apr. 21, 2026

(54) CONFIGURATION METHOD FOR A PHASE-CHANGE NON-VOLATILE MEMORY

(71) Applicant: STMicroelectronics International N.V., Geneva (CH)

(72) Inventor: Jawad Benhammadi, Pont de Claix (FR)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 18/940,372

(22) Filed: Nov. 7, 2024

(65) Prior Publication Data

US 2025/0165158 A1 May 22, 2025

(30) Foreign Application Priority Data

Nov. 21, 2023 (FR) ...................................... 2312769

(51) Int. Cl.
*G06F 3/06* (2006.01)

(52) U.S. Cl.
CPC .......... *G06F 3/0619* (2013.01); *G06F 3/0644* (2013.01); *G06F 3/0679* (2013.01)

(58) Field of Classification Search
CPC ..... G06F 3/0619; G06F 3/0644; G06F 3/0679
See application file for complete search history.

(56) References Cited

U.S. PATENT DOCUMENTS

| | | | |
|---|---|---|---|
| 2011/0317480 A1* | 12/2011 | Lung | G11C 13/004 |
| | | | 438/102 |
| 2014/0347914 A1 | 11/2014 | Sills | |
| 2015/0171095 A1* | 6/2015 | Wang | G11C 13/0069 |
| | | | 365/185.18 |
| 2016/0071608 A1* | 3/2016 | Bronner | G11C 16/3418 |
| | | | 365/185.18 |
| 2019/0103160 A1* | 4/2019 | Fang | G11C 29/028 |
| 2021/0173577 A1* | 6/2021 | Kale | G06F 3/048 |
| 2022/0382483 A1* | 12/2022 | Matsubara | G11C 17/16 |
| 2022/0398040 A1* | 12/2022 | Kang | G06F 3/0616 |

\* cited by examiner

*Primary Examiner* — Eric T Loonan

(74) *Attorney, Agent, or Firm* — Seed IP Law Group LLP

(57) ABSTRACT

The present description concerns a method of configuration of a phase-change non-volatile memory, comprising the partitioning of said memory into a first set of one or a plurality of regions having a first maximum number of write cycles and a second set of one or a plurality of other regions having a second maximum number of write cycles greater than the first maximum number of write cycles, the first and second maximum number of write cycles being linked to different physical write parameters.

16 Claims, 8 Drawing Sheets

202

204

306

708

DIVIDE THE AREA IN N SECTORS, N BEING SUPERIOR OR EQUAL TO THE RATIO OF THE MAXIMUM NUMBER OF WRITING CYCLES NEEDED AND THE MAXIMUM NUMBER OF WRITING CYCLES OF THE FIRST MODE

710

WRITE DATA IN ONE OF THE N SECTORS THEN CHANGE SECTOR WHEN REACHING A THRESHOLD

402

104

User memory

404

System memory

406

HCD

OTP

412

RO

414

416

USER OBs

418

Engi OBs

OBK0/1/2/3NS/3S

420

202

204

306

708

DIVIDE THE AREA IN N SECTORS, N BEING SUPERIOR OR EQUAL TO THE RATIO OF THE MAXIMUM NUMBER OF WRITING CYCLES NEEDED AND THE MAXIMUM NUMBER OF WRITING CYCLES OF THE FIRST MODE

710

WRITE DATA IN ONE OF THE N SECTORS THEN CHANGE SECTOR WHEN REACHING A THRESHOLD

CONFIGURATION METHOD FOR A PHASE-CHANGE NON-VOLATILE MEMORY

CROSS REFERENCE TO RELATED APPLICATION(S)

This application claims the priority benefit of French patent application number FR2312769, filed on Nov. 21, 2023, entitled "Procédé de configuration d'une mémoire non volatile à changement de phase."

BACKGROUND

Technical Field

The present description generally concerns methods of configuration of phase-change non-volatile memories as well as microcontrollers implementing these methods.

Description of the Related Art

Phase-change non-volatile memories incorporated in microcontrollers are potentially sensitive to high temperatures, such as those used during soldering steps. This may generate the alteration of data written into the memory prior to the soldering step. It is further difficult to predict at what point in the lifetime of the microcontroller the soldering step will take place.

BRIEF SUMMARY

A method is provided for configuring the phase-change non-volatile memory of a microcontroller so as to address cases where the microcontroller is soldered before or after the writing of data into the memory while keeping a satisfactory maximum number of write cycles.

An embodiment overcomes all or part of the disadvantages of known methods.

An embodiment provides a method of configuration of a phase-change non-volatile memory, comprising the partitioning of said memory into a first set of one or a plurality of regions having a first maximum number of write cycles and a second set of one or a plurality of other regions having a second maximum number of write cycles greater than the first maximum number of write cycles, the first and second maximum numbers of write cycles being linked to different physical write parameters.

An embodiment provides a microcontroller provided with a phase-change non-volatile memory, configured to implement a partitioning of said memory into a first set of one or a plurality of regions having a first maximum number of write cycles and a second set of one or a plurality of other regions having a second maximum number of write cycles greater than the first maximum number of write cycles, the first and second maximum numbers of write cycles being linked to different physical write parameters.

According to an embodiment, the first maximum number of write cycles corresponds to the use of a first write mode and the second maximum number of write cycles corresponds to the use of a second write mode.

According to an embodiment, the partitioning and the use of the first and of the second write mode are implemented by a memory interface.

According to an embodiment, when the first write mode is used, a data element written before a step of soldering of the microcontroller is kept stable during said soldering step.

According to an embodiment, when the second write mode is used, a value written before a step of soldering of the microcontroller is not kept stable during said soldering step.

According to an embodiment, the second maximum number of write cycles is at least five times greater than the first maximum number of write cycles.

According to an embodiment, the crystallinity of memory sectors of regions of the first and second sets is different, after writing, according to the use of the first or of the second write mode.

According to an embodiment, the use of the first or second write mode is defined for each region of each set by one or a plurality of option bytes.

According to an embodiment, the definition of the use of the first or of the second write mode is implemented with a bitmap register linked to the option byte(s).

According to an embodiment, when the use of the first write mode has been defined for one or a plurality of regions of one of the sets and this or these region(s) correspond to an application requiring a number Nappli of write cycles greater than the first maximum number of write cycles, then said region(s) are divided into N memory sectors into which the data of the application are successively written;

N being greater than or equal to the ratio of Nappli to the first maximum number of write cycles.

According to an embodiment, the N memory sectors have their respective address indexed and when one of the data elements of the application is written into the memory sector of index N, then the next data element is written into the sector having the lowest index.

According to an embodiment, after writing into a region by using the second write mode, said region can be rewritten into by using the first write mode.

According to an embodiment, after writing into a region by using the first write mode, said region cannot be rewritten into by using the second write mode.

According to an embodiment, the first write mode comprises the application of a first voltage, current, or power level; and the second write mode comprises the application of a second voltage, current, or power level different from the first voltage, current, or power level.

According to an embodiment, the first voltage, current, or power level is higher than the second voltage, current, or power level.

BRIEF DESCRIPTION OF THE SEVERAL VIEWS OF THE DRAWINGS

The foregoing features and advantages, as well as others, will be described in detail in the rest of the disclosure of specific embodiments given as an illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For clarity, only those steps and elements which are useful to the understanding of the described embodiments have been shown and are described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, where reference is made to absolute position qualifiers, such as "front," "back," "top," "bottom," "left," "right," etc., or relative position qualifiers, such as "top," "bottom," "upper," "lower," etc., or orientation qualifiers, such as "horizontal," "vertical," etc., reference is made unless otherwise specified to the orientation of the drawings.

Unless specified otherwise, the expressions "about," "approximately," "substantially," and "in the order of" signify plus or minus 10%, preferably of plus or minus 5%.

Figure 1:
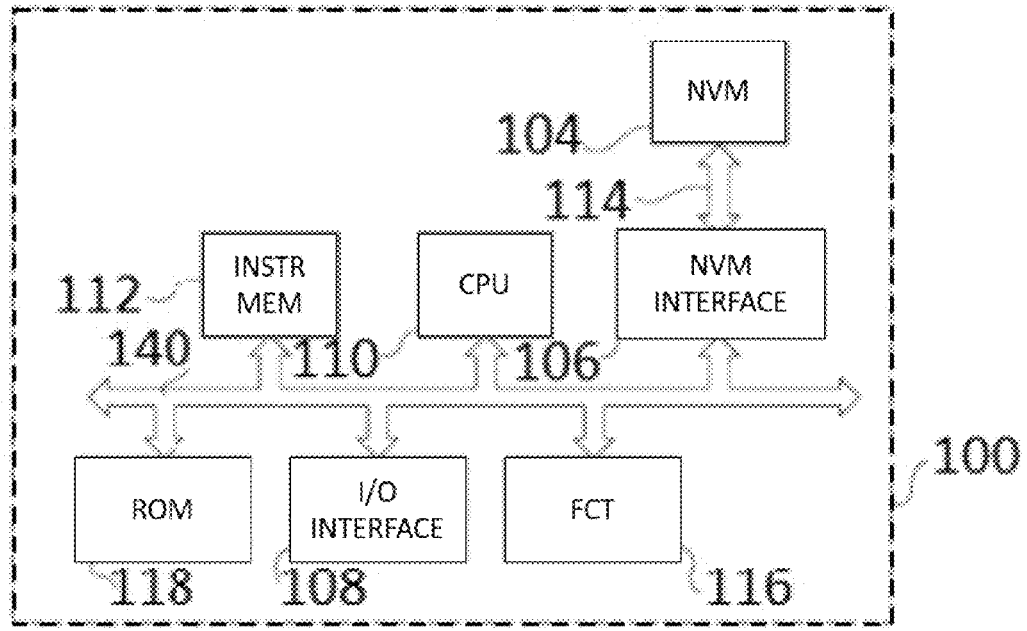
FIG. 1 shows, very schematically and in the form of blocks, an example of a microcontroller of the type to which the described embodiments apply.

FIG. 1 shows, very schematically and in the form of blocs, an example of a microcontroller 100 of the type to which the described embodiments apply. Microcontroller 100 is, for example, a microcontroller.

Microcontroller 100 comprises a non-volatile memory 104 (NVM), for example of phase-change type, capable of communicating, via a communication bus 114, with a non-volatile memory interface 106 (NVM INTERFACE) configured to write or read data into and from non-volatile memory 104.

Microcontroller 100 further comprises, for example, a processing unit 110 (CPU) comprising one or a plurality of processors under control of instructions stored in an instruction memory 112 (INSTR MEM). Instruction memory 112 is, for example, a volatile random access memory (RAM). Processing unit 110 and memory 112 communicate, for example, via a system (data, address, and control) bus 140. Memory 104 is coupled to system bus 140 via non-volatile memory interface 106 and via bus 114. Device 100 further comprises an input/output interface 108 (I/O interface) coupled to system bus 140 to communicate with the outside.

Microcontroller 100 may integrate other circuits implementing other functions (for example, one or a plurality of volatile and/or non-volatile memories, or other processing units), symbolized by a block 116 (FCT) in FIG. 1. Among these other circuits, microcontroller 100 for example comprises a read-only or static memory 118 (ROM).

Memory 104 is for example partitioned into different regions comprising one or a plurality of memory sectors. In a phase-change memory 104, these sectors can be rewritten directly without the need for a prior erase operation. The writing into these sectors is performed by changing their resistance, for example by the application of physical write parameters such as a voltage or a current at the time of the writing.

A plurality of write modes have recently been developed to write data into the memory sectors of phase-change memories. Certain write modes allow a high maximum number of write cycles, for example in the order of 10,000 cycles, while other write modes allow a lower maximum number of write cycles, for example in the order of 1,000 cycles, but with a higher temperature resistance. The performance in terms of cycling of the different write modes is linked, for example, to a change in the crystallinity of the memory sectors according to the selected write mode. By the term crystallinity, there is similarly meant an atomic arrangement, for example, an orientation of atomic planes, lattice parameters, or an amorphous, polycrystalline, or monocrystalline character. The sectors written into with the write modes allowing a high maximum number of write cycles (e.g., 10,000 cycles) are however more sensitive to high temperatures such as those reached in microcontroller 100 when it is being soldered. Data written in write modes allowing a high cycling thus may be corrupted or erased, in other words are not robust, when the microcontroller is being soldered.

The different regions of memory 104 are for example used by different applications implemented by microcontroller 100. Each type of application may require a different maximum cycling number. Certain applications may also be implemented in factory by the microcontroller manufacturer and others may be loaded by external service providers who will solder the microcontroller in a product before or after the writing of the data. It is thus difficult to predict at what time the microcontroller will be soldered.

On the other hand, conventional non-volatile memories, that is, those which are not phase-change memories, allow a high write cycling without however being overly sensitive to temperature. Customers or service providers should thus be allowed to use phase-change memories in a way close to the use of conventional non-volatile memories.

The described embodiments provide the partitioning of memory 104 into a first set of one or a plurality of regions having a first maximum number of write cycles and a second set of one or a plurality of other regions having a second maximum number of write cycles greater than the first maximum number of write cycles, the first and second maximum number of write cycles being linked to different physical write parameters.

This enables to take advantage of the benefits of phase-change memories, such as the absence of the need for an erasing before a rewriting, while providing a flexibility in the selection of write mode to the various customers or service providers using microcontroller 100. It is thus for example possible to select, for a given region of the memory, a solder-resistant write mode, and for another region, another write mode which is non-robust with regard to the soldering step but is anyway implemented after the soldering.

An embodiment further enables to obtain a maximum number of write cycles as for a conventional non-volatile memory, while ensuring that the data written before the soldering will be kept robust.

Figure 2:
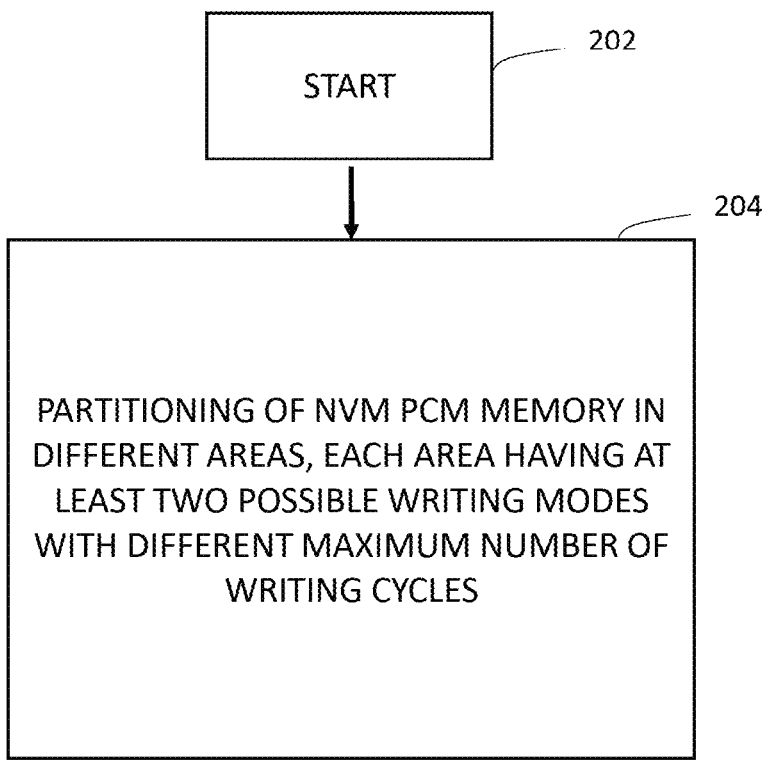
FIG. 2 shows in the form of blocks a method of configuration of a block of FIG. 1 according to an embodiment.

FIG. 2 shows a block diagram of a method of configuration of the block of FIG. 1 according to an embodiment. More particularly, FIG. 2 illustrates a method of configuration of memory 104.

During a first step 202 (START), the method of configuration of memory 104 starts and is implemented, for example by means of memory interface 106.

During a second step 204 (PARTITIONING OF NVM PCM MEMORY IN DIFFERENT AREAS, EACH AREA HAVING AT LEAST TWO POSSIBLE WRITE MODES WITH DIFFERENT MAXIMUM NUMBER OF WRITING CYCLES), memory 104 is divided, for example by using memory interface 106, into one or a plurality of regions, each having a plurality of possible write modes. The region(s) are each formed of one or a plurality of memory sectors. In other words, memory 104 is partitioned into a plurality of regions, each having a plurality of possible write modes, each write mode allowing a maximum number of memory sector write cycles and a temperature resistance of the data which are specific thereto.

In an example, a first write mode (power mode) enables a data element written prior to a step of soldering of microcontroller 100 into a memory sector of one of the regions of memory 104 to be kept stable during the step of soldering of microcontroller 100. The first write mode is for example obtained by application of a first voltage level, of a first current level, or a first electric power level. These first voltage, current, or power levels may also comprise voltage, current, or power variations.

In an example of a second write mode (user mode), a data element written into a memory sector prior to a microcontroller soldering step is not kept stable during the soldering step. This difference in temperature resistance between the first mode and the second mode is due, for example, to the fact that the first mode (power mode) implements one or a plurality of voltage(s), current(s), or power(s) higher than those implemented for the second mode (user mode). The second write mode is for example obtained by the application of a second voltage level, of a second current level, or of a second electric power level different from, for example lower than, the first voltage, current, or power level. These second voltage, current, or power levels may also comprise voltage, current, or power variations. In an example, the resistivity of memory sectors of a region obtained with the second write mode is different from the resistivity obtained with the first write mode.

In an example, the second write mode (user mode) allows a higher maximum number of write cycles than the first write mode (power mode), for example more than five times higher. The second write mode (user mode) allows a maximum number of write cycles for example in the order of 10,000 cycles, while the first write mode (power mode) allows a maximum number of write cycles for example in the order of 1,000 cycles, but with a higher temperature resistance of the written data.

The difference between the maximum number of write cycles achievable by the first write mode and the second write mode is for example due to differences between the first and second voltage or current modes.

Figure 3:
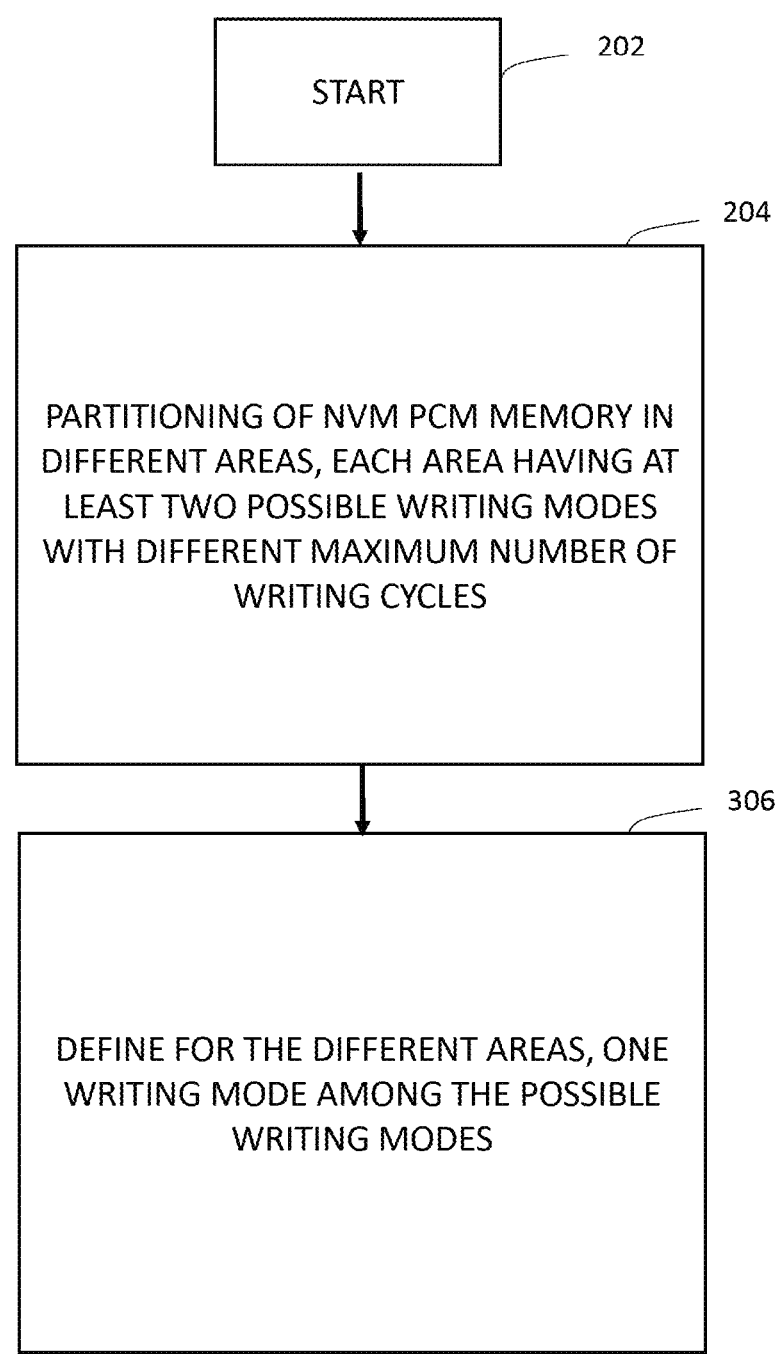
FIG. 3 shows in the form of blocks a method of configuration of a block of FIG. 1 according to another embodiment.

FIG. 3 shows in the form of blocks a method of configuration of a block of FIG. 1 according to another embodiment. The method of FIG. 3 is similar to the method of FIG. 2, but with an additional step 306 (DEFINE FOR THE DIFFERENT AREAS, ONE WRITE MODE AMONG THE POSSIBLE WRITE MODES) implemented after step 204.

At step 306, a write mode, among the possible write modes, for example either the first or the second mode, is defined, in other words selected, for each region of memory 104. This definition is for example implemented by memory interface 106.

By the term designation, there is meant that each region is assigned a write mode selected from among the first or the second write mode, for example. The selection of the write mode is performed, for example, by the changing of an option byte.

In the case where the first write mode permanently modifies the crystallinity of the memory sectors, after the writing into memory sectors of a region defined with the first write mode (power mode), these sectors cannot be rewritten into when said region is subsequently defined with the second write mode (user mode).

Conversely, in the case where the second write mode (user mode) does not permanently modify the crystallinity of the memory sectors, after the writing into memory sectors of a region defined with the second write mode (user mode), these sectors can be rewritten into if said region is then defined with the first write mode (power mode).

The method of FIG. 3 provides the possibility of designating or of assigning, for each region, the first or the second write mode, for example, while allowing the use of the microcontroller by several successive service providers or customers.

Figure 4:
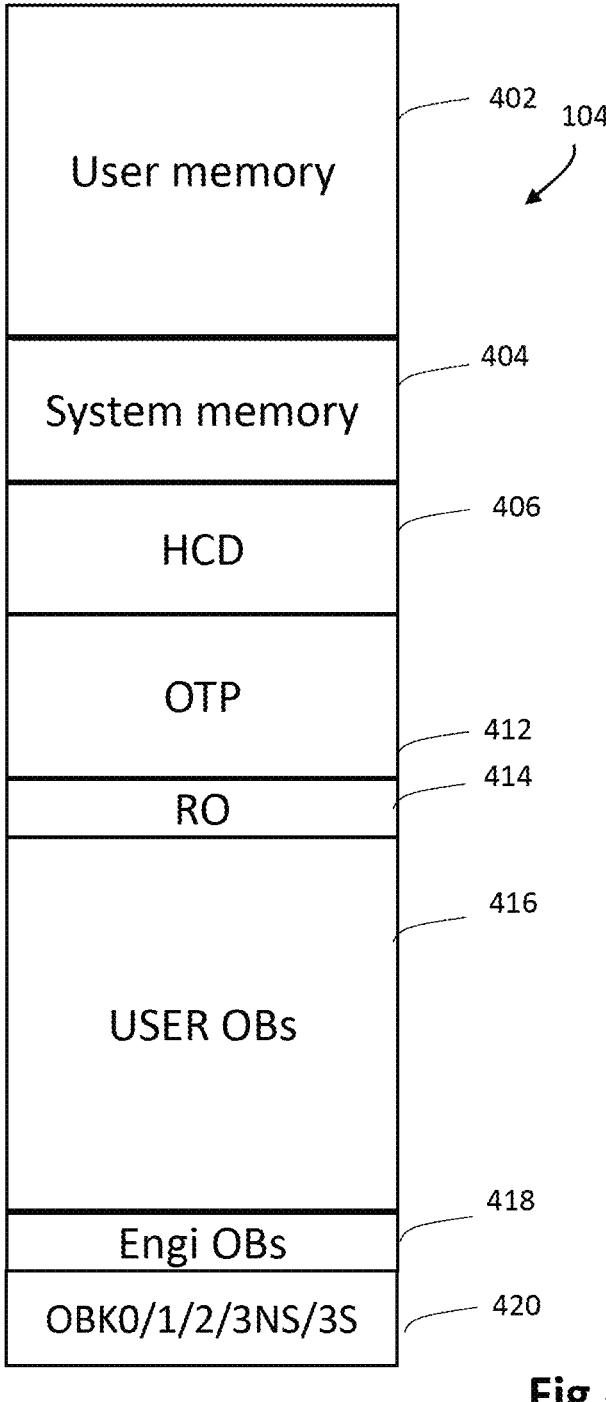
FIG. 4 very schematically shows an example of a block of the microcontroller according to an embodiment.

FIG. 4 shows, very schematically, an example of a block of microcontroller 100 according to an embodiment.

More particularly, FIG. 4 shows an example of a partitioning of memory 104 into regions 402 (User memory), 404 (System memory), 406 (HCD), 408 (OBK1/2/3), 410 (OBK0), 412 (OTP), 414 (RO), 416 (USER OBs), and 418 (Engi Obs). The write mode defined for each of the regions of the example of FIG. 4 depends on the use of the regions, for example by different applications.

Region 402 comprises, for example, a plurality of subsections, each subsection being defined with one of the write modes. In an example, each subsection corresponds to a group of a plurality of sectors, for example four. For the definition of the write mode of each subsection, a bitmap register is for example used in association with the option byte(s). In an example, the setting to 0 or to 1 of an option bit or byte of the bitmap register corresponds to the defining of the write mode selected for the subsection corresponding to said bit or byte. In an example, the bitmap register is called NVM_WRMyR. In this example, a first subsection is noted NVM_WRMyR [0], a second one is noted NVM_WRMyR [1], and a third one is noted NVM_WRMyR [2], etc. The bitmap register associates a bit or byte representing the first or the second write mode (for example 0 for the first mode and 1 for the second one) with each of the subsections of region 402.

Region 404 is for example used by an application having its data written by the manufacturer of microcontroller 100. Further, since region 404 is not intended to be rewritten into, it only requires a small write cycling capacity. A soldering step will probably be implemented later in the microcontroller lifetime. Region 404 is thus defined with the first write mode, for example, so that the data can be kept during the soldering step.

Region 406 is used, for example, by an application requiring a large number of write cycles. Region 406 is thus defined with the second write mode. In an example, this definition of the write mode is hard-coded from as soon as the microcontroller manufacturing, in order not to be modifiable by a program.

Region 412 for example corresponds to one-time programmable data. The low cycling level required thus enables to use for this region the first write mode (power mode).

Region 414 for example corresponds to data which can only be read (Read Only Data). The low required write cycling level thus enables to use for this region 414 the first write mode (power mode).

Region 416 for example corresponds to data which are written by the manufacturer of the microcontroller, but which can be updated by an external service provider during the microcontroller lifetime, for example. In other words, the microcontroller is likely to be soldered after the writing of the data by the manufacturer. The write mode defined for this region thus has to be the first write mode (power mode). However, it may be necessary for data updates in this region to remain possible all throughout the lifetime of microcontroller 100. For example, certain applications require for a greater number Nappli, for example 10,000, of write cycles to be achievable.

Figure 6:
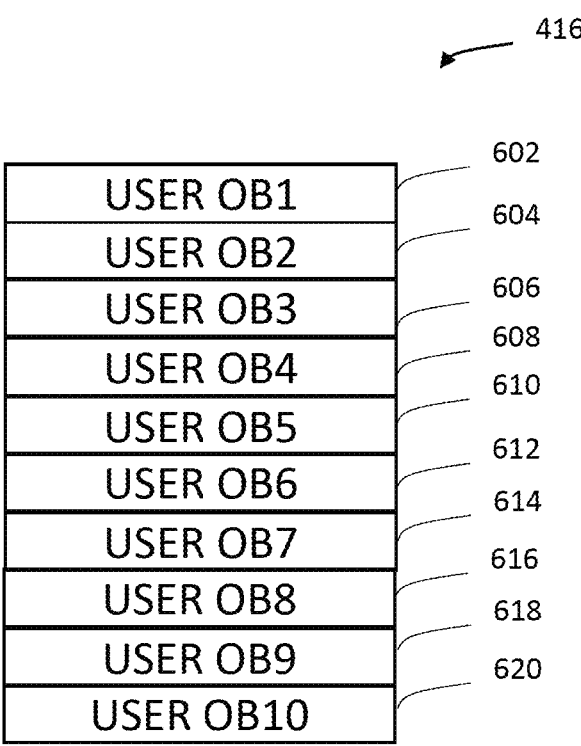
FIG. 6 very schematically shows an example of a block of FIG. 4.
Figure 7:
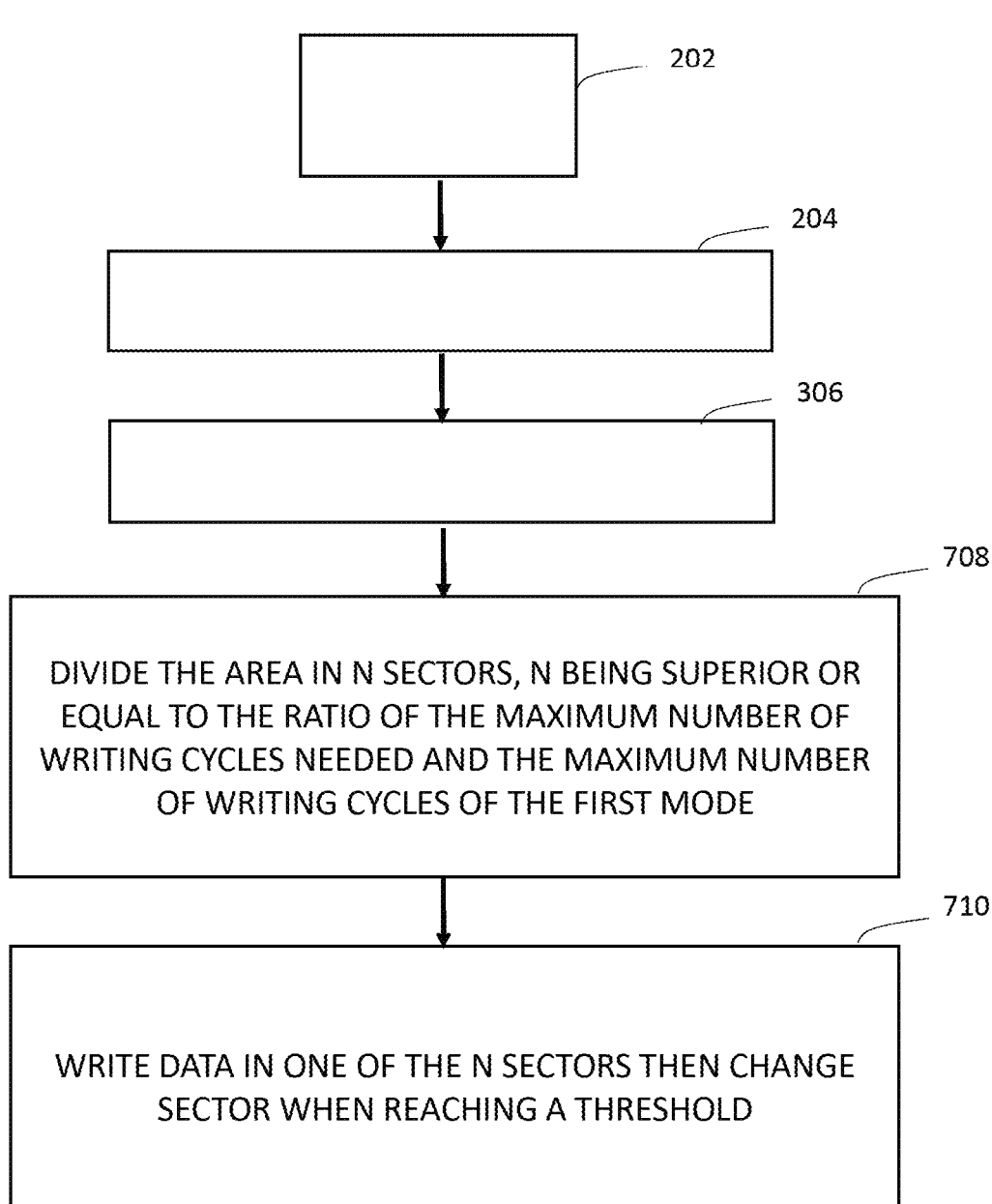
FIG. 7 shows in the form of blocks a method of configuration of and of writing into the block of FIG. 6.

The embodiments described in FIGS. 6 and 7 enable to address this problem.

Region 418 is, for example, programmed by the manufacturer with data which for example correspond to manufacturing or debug data issued by the manufacturer. The number of write cycles in the microcontroller lifetime is decreased and region 418 is thus defined with the first write mode (power mode) to withstand the soldering step.

Region 420 comprises, for example, five subsections OBK0, OBK1, OBK2, OBK3NS, and OBK3S, which comprise option byte keys which correspond to security keys for different service providers, for example. These option byte keys are programmable, for example, by different service providers external to the manufacturer. It is for example possible to enable the four subsections OBK1, OBK2, OBK3NS, and OBK3S to be defined with a programmable write mode after the manufacturing, which enables to gain flexibility of use.

Subsection OBK0 is for example programmed by the manufacturer with data which must remain robust all throughout the lifetime of microcontroller 100. Subsection OBK0 is thus defined with the first write mode (power mode). In an example, this definition of the write mode is hard-coded from as soon as the microcontroller manufacturing, in order not to be modifiable by a program.

In an example, not shown, all subsections OBK1, OBK2, OBK3NS, and OBK3S, due to two sectors, a current sector which contains the valid values of all the security keys of subsections OBK1, OBK2, OBK3NS, and OBK3S and a substitute sector used to update these keys. To update a key in one of the subsections, the substitute sector is selected, for example with the implementation of a dedicated register, after which the new key is written, by software means, for example, into the substitute sector and the valid keys of the other subsections are copied in the substitute sector for example by a state machine associated with a command for example called OBKSWAP. Command OBKSWAP is implemented, for example via memory interface 106, to exchange the role of the two sectors. The substitute sector thus becomes the current sector where the data element of the new key is valid. Since subsections OBK1, OBK2, OBK3NS, and OBK3S can be defined with different write modes and used with a different number of write cycles, it is not recommended to update all subsections each time a key of a single one of the subsections has to be updated. For example, if subsections OBK0 and OBK1 are programmed with the first write mode (power mode) and the other subsections are programmed with the second mode (user mode), then if the user updates a thousand times the key in OBK2, subsections OBK0 and OBK1 also cycle a thousand times, which becomes damageable with the first write mode.

Figure 5:
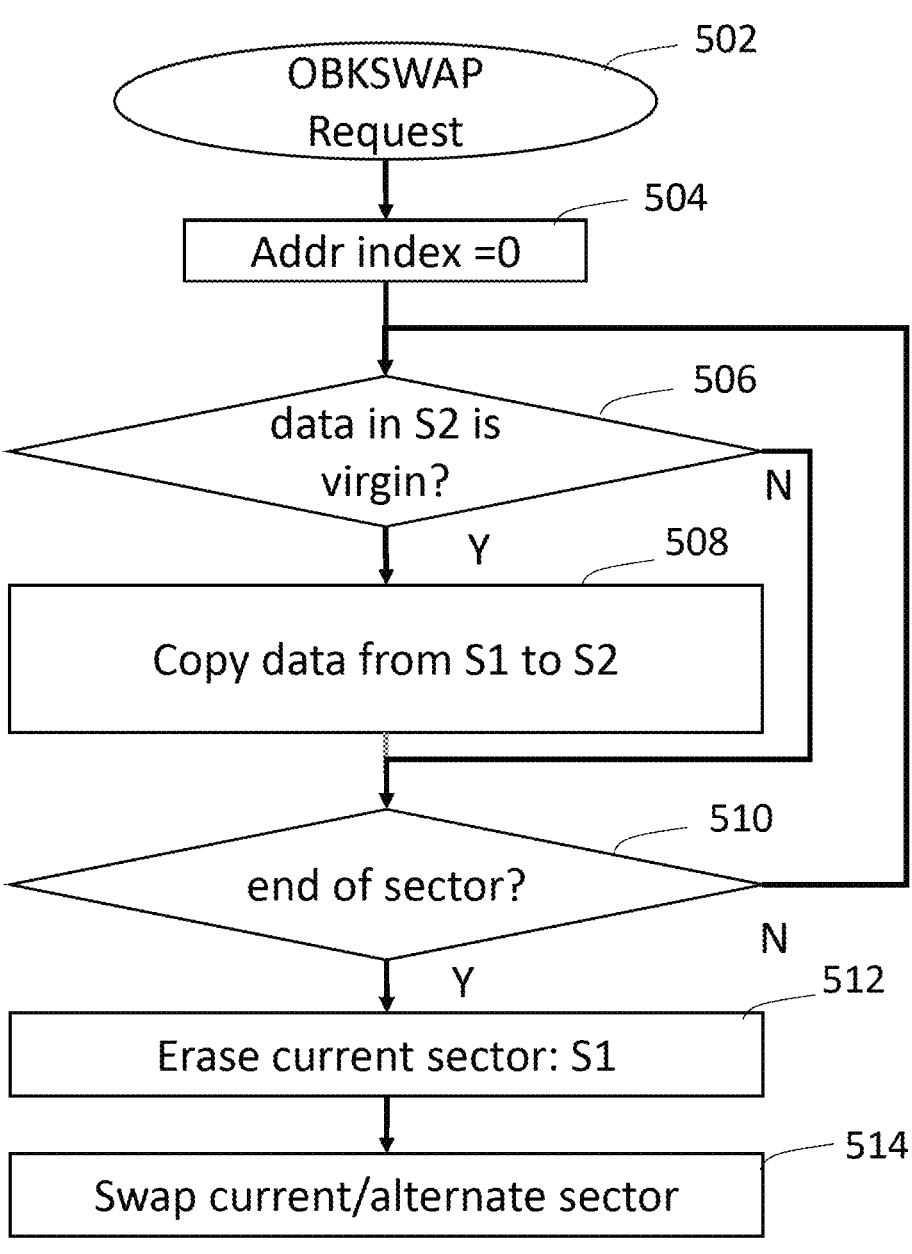
FIG. 5 shows in the form of blocks a method of configuration of a block of FIG. 4.

It is thus necessary to provide a different method for the writing into the subsections of region 420 which is compatible with the fact for a plurality of write modes to be possibly defined for the different subsections OBK0, OBK1, OBK2, OBK3NS, and OBK3S, FIG. 5 shows in the form of blocks a method of configuration of a block of FIG. 4 according to an embodiment. More particularly, FIG. 5 illustrates a method of writing into the subsections OBK1, OBK2, OBK3NS, and OBK3S of region 420.

The method of FIG. 5 consists in that each subsection OBK0, OBK1, OBK2, OBK3NS, and OBK3S is managed independently for the data update, with two sectors specific to each of the subsections.

Since subsections OBK1, OBK2, OBK3NS, and OBK3S are treated, in the example shown in FIG. 5, independently, FIG. 5 shows the method of writing a new key into a single one of the subsections, that is, the subsection which is concerned by the update of one of the keys, the other subsections remaining with unchanged sectors.

At a step 502 (OBKSWAP Request), the current sector is called S1 and the substitute sector is called S2. In this step, the command called OBKSWAP is implemented, for example, with a state machine.

At a step 504 (Addr index=0), subsequent to step 502, an index of the address read from the current sector starts at zero.

At a step 506 (data in S2 is virgin?), subsequent to step 504, it is checked whether the address corresponding to the current index is blank. If it is (branch Y), step 508 (Copy data from S1 to S2) is carried out. If it is not, a step 510 (end of sector?) is carried out.

At step 508, the data from the current sector S1 are copied with the updated key into substitute sector S2, after which step 510 is carried out.

At step 510, if the address index corresponds to an end-of-sector address (branch Y), then a step 512 (Erase current sector: S1) is carried out. If the index does not correspond to an end-of-sector address (branch N), then the index is incremented and the method resumes at step 506.

At step 512, the current sector S1 is erased.

Step 512 is followed by a step 514 (Swap current/alternate sector) in which the current sector S1 becomes the substitute sector and the substitute sector S2 becomes the current sector.

FIG. 6 shows, very schematically, an example of a block of FIG. 4. FIG. 6 more particularly shows an example implementation of region 416, which is, in this embodiment divided into ten sectors or groups of sectors 602 (USER OB1), 604 (USER OB2), 606 (USER OB3), 608 (USER OB4), 610 (USER OB5), 612 (USER OB6), 614 (USER OB7), 616 (USER OB8), 618 (USER OB9), and 620 (USER OB10). Each sector of region 416 is defined with the first write mode.

This example of implementation, associated with the write method described in the next drawing, enables an application using region 416 to benefit from the robustness of data written with the first write mode (power mode), while at the same time benefiting from a maximum number of write cycles greater than that available for the first write mode (power mode).

FIG. 7 shows, in the form of blocks, a method of configuration and writing of the block of FIG. 6. More particularly, FIG. 7 shows a method of configuration and of writing into region 416 of FIG. 6.

The method of FIG. 7 comprises steps 202, 204, and 306 similar to the example of FIG. 3.

In an additional step 708 (DIVIDE THE AREA IN N GROUPS OF SECTORS, N BEING SUPERIOR OR EQUAL TO THE RATIO OF THE MAXIMUM NUMBER OF WRITING CYCLES NEEDED AND THE MAXIMUM NUMBER OF WRITING CYCLES OF THE FIRST MODE), carried out after step 306, if the maximum number Nappli of write cycles required for an application using region 416 is greater than the maximum number of write cycles of the first write mode (power mode), then this region is divided into N memory sectors into which the data of the application are written. N is, for example, greater than or equal to the ratio of Nappli to the maximum number of write cycles in the first write mode (power mode).

At a step 710 (WRITE DATA IN ONE OF THE GROUP OF SECTORS THEN CHANGE SECTOR WHEN REACHING A THRESHOLD), subsequent to step 708, a counter counts the number of write cycles which have taken place in each of the N memory sectors.

In an example, when the counter reaches a given threshold for one sector, then the data are written into another sector. In an example, the sector having the less written data becomes the sector into which new data of the application are written when the counter reaches this threshold.

Steps 708 and 710 are for example carried out by means of memory interface 106.

Each sector of region 416 for example having a capacity of 1,000 write cycles due to the use of the first write mode (power mode), by switching from one sector to another, it is possible to achieve, for region 416 as a whole, a maximum number of write cycles of 10,000 (10*1000) cycles, which is much higher than the maximum number of write cycles of the first write mode (power mode), while keeping a robustness of the written data regarding a soldering step.

Figure 8:
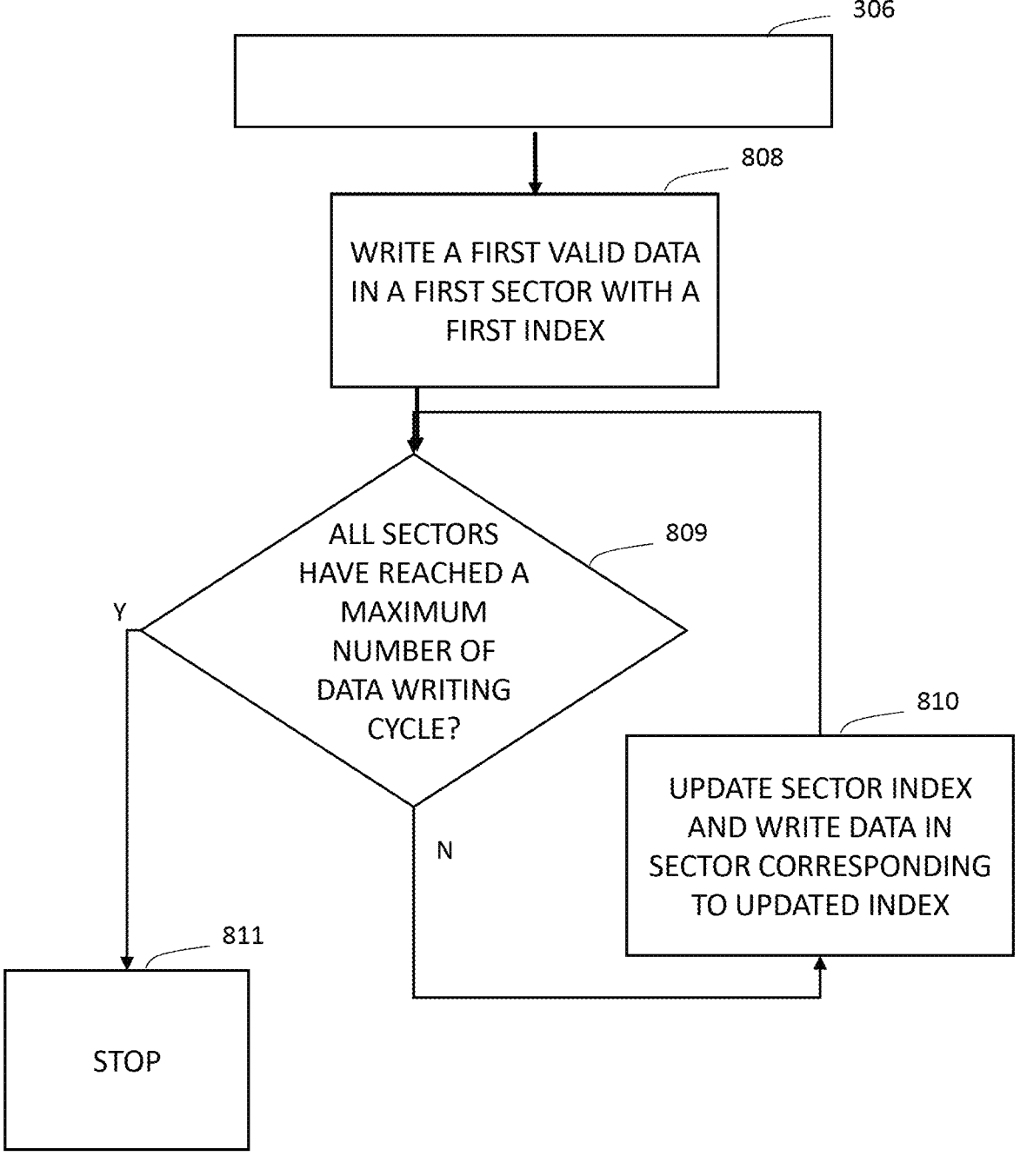
FIG. 8 shows in the form of blocks another method of configuration of and of writing into the block of FIG. 6.

FIG. 8 shows in the form of blocks another method of configuration and of writing into the block of FIG. 6. In particular, FIG. 8 shows a method of configuration and of writing into region 416 of FIG. 6.

The method of FIG. 8 comprises steps 202, 204, and 306 similar to the example of FIG. 3.

In an additional step 808 (WRITE A FIRST VALID DATA IN A FIRST SECTOR WITH A FIRST INDEX), carried out subsequently to step 306, a valid data element is written, with the first write mode, into a first sector or group of sectors of region 416, the address of which has a first index. This data element corresponds, for example, to a security key such as an option byte key.

At a step 809 (ALL SECTORS HAVE REACHED A MAXIMUM NUMBER OF DATA WRITING CYCLE?) subsequent to step 808, if the N sectors or groups of sectors of region 416 have been written a number of times equal to the maximum possible number of write cycles of the first write mode (branch Y), then the method stops with a step 811 (STOP). In the opposite case (branch N), a step 810 (UPDATE SECTOR INDEX AND WRITE DATA IN SECTOR CORRESPONDING TO UPDATED INDEX) is implemented.

At step 810, the data element previously written into the first sector is no longer valid. In this step, the index of the address relative to the sector or group of sectors of region 416 is incremented, except if the index is equal to the number N defined in FIG. 7. If the index is equal to N, then the index is reset to 0, for example as in a circular permutation. The new valid data element is then written, with the first write mode (power mode), into the sector or group of sectors of region 416 having its address corresponding to the updated index. The N sectors are thus each filled in turn until the maximum number of write cycles associated with the use of the first write mode has been reached for each of the sectors.

Step 809 is then implemented again.

Steps 808, 809, and 810 are for example implemented by means of memory interface 106.

In the example where the maximum number of write cycles of the first mode is 1,000 cycles, it is thus possible to reach, for region 416 as a whole, a maximum number of write cycles of 10,000 (10*1000) cycles, which is much higher than the maximum number of write cycles of the first write mode (power mode), while keeping a robustness of the written data regarding a soldering step.

Various embodiments and variants have been described. Those skilled in the art will understand that certain features of these various embodiments and variants may be combined, and other variants will occur to those skilled in the art. In particular, the use of bitmap registers may be generalized to all regions of memory 104.

Finally, the practical implementation of the described embodiments and variants is within the abilities of those skilled in the art based on the functional indications given hereabove. In particular, even though the method has been described in the case of a microcontroller, those skilled in the art may implement their knowledge to apply this method to other types of electronic circuits such as systems on chip (SOC).

Method of configuration of a non-volatile phase change memory (104), can include the partitioning of said memory (104) into a first set of one or a plurality of regions (402, 404, 406, 408, 410, 412, 414, 416, 418) having a first maximum number of write cycles and a second set of one or a plurality of other regions (402, 404, 406, 408, 410, 412, 414, 416, 418) having a second maximum number of write cycles greater than the first maximum number of write cycles, the first and second maximum numbers of write cycles being linked to different physical write parameters.

Microcontroller (100) can be provided with a phase-change non-volatile memory (104), configured to implement a partitioning of said memory (104) into a first set of one or a plurality of regions (402, 404, 406, 408, 410, 412, 414, 416, 418) having a first maximum number of write cycles and a second set of one or a plurality of other regions (402, 404, 406, 408, 410, 412, 414, 416, 418) having a second maximum number of write cycles greater than the first maximum number of write cycles, the first and second maximum numbers of write cycles being linked to different physical write parameters.

The first maximum number of write cycles can correspond to the use of a first write mode (power mode) and the second maximum number of write cycles can correspond to the use of a second write mode (user mode).

The partitioning and the use of the first and of the second write modes can be implemented by a memory interface (106).

When the first write mode (power mode) is used, a data element written before a step of soldering of the microcontroller (100) can be kept stable during said soldering step.

When the second write mode (user mode) is used, a value written before a step of soldering of the microcontroller (100) may not be kept stable during said soldering step.

The second maximum number of write cycles can be at least five times greater than the first maximum number of write cycles.

The crystallinity of memory sectors of regions of the first and second sets can be different, after writing, according to the use of the first or of the second write mode.

The use of the first or second write mode can be defined for each region of each set by one or a plurality of option bytes.

The definition of the use of the first or of the second write mode can be implemented with a bitmap register linked to the option byte(s).

When the use of the first write mode (power mode) has been defined for one or a plurality of regions of one of the sets and this or these regions correspond to an application requiring a number Nappli of write cycles greater than the first maximum number of write cycles, then said region(s) can be divided into N memory sectors (502, 504, 506, 508, 510, 512, 514, 516, 518, 520) into which data of the application are successively written; N being greater than or equal to the ratio of Nappli to the first maximum number of write cycles.

The N memory sectors can have their respective addresses indexed and when one of the data elements of the application is written to the memory sector of index N, the next data element can then be written into the sector having the lowest index.

After a writing into a region by using the second write mode (user mode), said region can be rewritten into by using the first write mode (power mode).

After a writing into a region by using the first write mode (power mode), said region may not be rewritten into by using the second write mode (user mode).

The first write mode (power mode) can include the application of a first voltage, current, or power level; and the second write mode (user mode) can include the application of a second voltage, current, or power level different from the first voltage, current, or power level.

The first voltage, current, or power level can be higher than the second voltage, current, or power level.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of configuration of a non-volatile phase change memory, comprising:
   partitioning the non-volatile phase change memory into a first set of one or more regions having a first maximum number of write cycles and a second set of one or more other regions having a second maximum number of write cycles greater than the first maximum number of write cycles,
   wherein the first and second maximum numbers of write cycles are linked to different physical write parameters, the first maximum number of write cycles corresponds to a use of a first write mode and the second maximum number of write cycles corresponds to a use of a second write mode, and wherein the use of the first write mode is defined for one or more regions of one of the first and second sets, the one or more regions of one of the first and second sets correspond to an application requiring a target number of write cycles greater than the first maximum number of write cycles, and the one or more regions of one of the first and second sets are divided into N memory sectors into which data of the application are successively written, N being greater than or equal to the ratio of the target number of write cycles to the first maximum number of write cycles.

2. The method according to claim 1, wherein the partitioning and the use of the first and of the second write modes are implemented by a memory interface.

3. The method according to claim 1, wherein, when the first write mode is used, a data element written before a step of soldering of a microcontroller is kept stable during the soldering step.

4. The method according to claim 1, wherein, when the second write mode is used, a value written before a step of soldering of a microcontroller is not kept stable during the soldering step.

5. The method according to claim 1, wherein the second maximum number of write cycles is at least five times greater than the first maximum number of write cycles.

6. The method according to claim 1, wherein a crystallinity of memory sectors of regions of the first and second sets is different, after writing, according to the use of the first or of the second write mode.

7. The method according to claim 1, wherein the use of the first or second write mode is defined for each region of each set by one or more of option bytes.

8. The method according to claim 7, wherein the definition of the use of the first or of the second write mode is implemented with a bitmap register linked to the one or more of option bytes.

9. The method according to claim 1, wherein the N memory sectors have their respective addresses indexed and when one of a plurality of data elements of the application is written to the memory sector of index N, a next data element of the plurality of data elements is then written into a sector having a lowest index.

10. The method according to claim 1 wherein, after a writing into a region by using the second write mode, the region can be rewritten into by using the first write mode.

11. The method according to claim 1 wherein, after a writing into a region by using the first write mode, the region cannot be rewritten into by using the second write mode.

12. The method according to claim 1, wherein the first write mode comprises application of at least one of a first voltage, current, or power level; and
   the second write mode comprises application of at least one of a second voltage, current, or power level different from the at least one of the first voltage, current, or power level.

13. The method according to claim 12, wherein at least one of the first voltage, current, or power level is higher than the at least one of the second voltage, current, or power level.

14. A microcontroller provided with a phase-change non-volatile memory, configured to:
   implement a partitioning of the phase-change non-volatile memory into a first set of one or more regions having a first maximum number of write cycles and a second set of one or more other regions having a second maximum number of write cycles greater than the first maximum number of write cycles, wherein the first and second maximum numbers of write cycles are linked to different physical write parameters, the first maximum number of write cycles corresponds to a use of a first write mode and the second maximum number of write cycles corresponds to a use of a second write mode, and wherein the use of the first write mode is defined for one or more regions of one of the first and second sets, the one or more regions of one of the first and second sets correspond to an application requiring a target number of write cycles greater than the first maximum number of write cycles, and the one or more regions of one of the first and second sets are divided into N memory sectors into which data of the application are successively written, N being greater than or equal to the ratio of the target number of write cycles to the first maximum number of write cycles.

15. The microcontroller according to claim 14, wherein the use of the first or second write mode is defined for each region of each set by one or a plurality of option bytes.

16. The microcontroller according to claim 14, wherein the first write mode comprises application of at least one of a first voltage, current, or power level, and the second write mode comprises application of at least one of a second voltage, current, or power level different from the at least one of the first voltage, current, or power level.

* * * * *